UNITED STATES PATENT OFFICE.

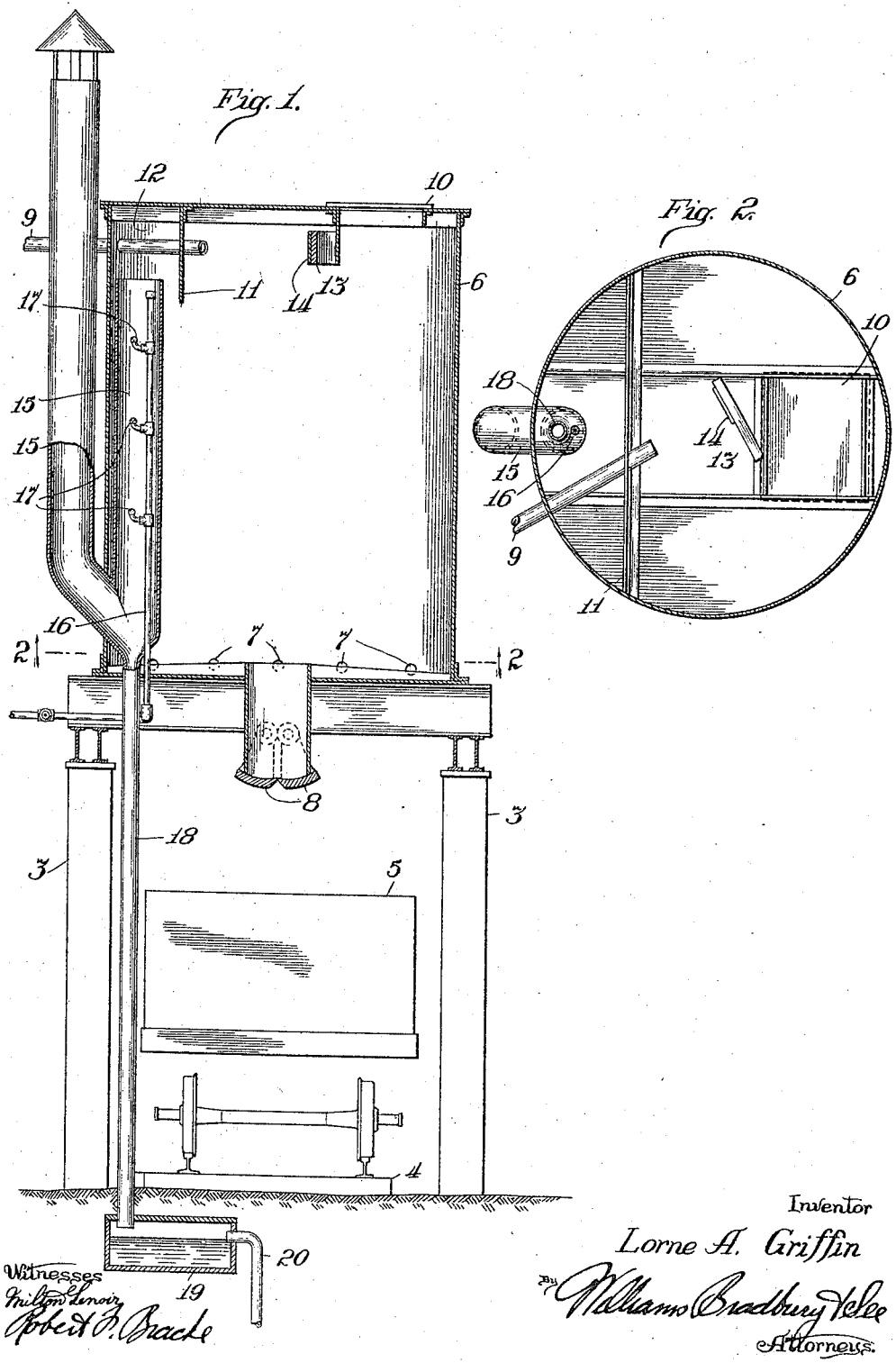

LORNE A. GRIFFIN, OF EVANSTON, ILLINOIS, ASSIGNOR TO AMERICAN STEAM CONVEYOR CORPORATION, OF CHICAGO, ILLINOIS, A CORPORATION OF NEW YORK.

TANK FOR ASH-CONVEYER SYSTEMS.

1,300,605. Specification of Letters Patent. Patented Apr. 15, 1919.

Application filed July 18, 1917. Serial No. 181,433.

*To all whom it may concern:*

Be it known that I, LORNE A. GRIFFIN, a citizen of the United States, residing at Evanston, in the county of Cook and State of Illinois, have invented a certain new and useful Improvement in Tanks for Ash-Conveyer Systems, of which the following is a full, clear, concise, and exact description, reference being had to the accompanying drawings, forming a part of this specification.

My invention relates to tanks of the class employed with ash conveyer systems of the type wherein the ashes are carried by steam under pressure through a conduit to a discharge point—in the present case the improved tank of my invention.

My invention contemplates improved means for washing the ash dust from the steam and entrained air which is discharged into the tank along with the ashes, and improved means for venting the washed steam and entrained air to the atmosphere. My invention also contemplates an improved arrangement for permitting the escape of wash water and condensed steam from the tank and preventing the same from freezing during cold weather.

These and other features of my present invention will more fully appear as this description progresses.

In the accompanying drawings illustrating my invention:

Figure 1 is a view partly in elevation, and partly in section, illustrating an ash tank embodying my invention; and Fig. 2 is a horizontal sectional view taken on the line 2—2 of Fig. 1, looking in the direction indicated by the arrows.

Similar characters of reference refer to similar parts in both of the figures.

Referring to the drawings, I have illustrated at 3—3 suitable tank supports between which may be placed a track 4, whereby a suitable car 5 may be placed under the tank carried by the supports 3 to receive the ashes discharged therefrom. At 6 I have illustrated the ash tank provided with a sloping bottom, drain tile 7 and discharge gate 8. With these features of the tank, my present invention is not particularly concerned, wherefore the same have not been shown in all of their detail.

Leading horizontally into the tank 6 at a point near the top thereof is a conduit 9, which, it will be understood, constitutes the discharge end of an ash conveyer conduit through which ashes are carried to the tank 6. The principal characteristics of ash conveyer systems of this class are now quite well known, and it will be unnecessary for me to illustrate the same or describe them here. The top of the tank 6 is conveniently provided with a manhole 10 to permit ready access to the inside of the tank. Supported by the top of the tank 6 is a deflector plate 11, which is suspended from the plate and extends across the inside of the tank to provide a segmental chamber 12 closed at the top but open at the bottom. It will be noted that the discharge end of the conduit 9 extends across the segmental chamber 12 and passes through an aperture in the deflector plate 11.

Supported by the top of the tank 6 and disposed in alinement with the conduit 9 is a baffle plate 13, which is desirably provided with an impact face 14 formed by a plate of chilled metal. This general arrangement of the discharge conduit, deflector and baffle plates is described and claimed in my Patent No. 1,211,310, dated January 2, 1917.

In order to permit the escape of steam and entrained air from the tank 6, I provide a vent in the form of a substantially U-shaped pipe 15, which extends through the tank wall near the bottom thereof, the legs of the U-shaped pipe extending vertically one inside and one outside of the tank. That one of the U-shaped legs of the pipe 15 which lies within the tank extends upwardly into the segmental chamber 12, whereas the upper end of the other leg communicates with the atmosphere, as shown.

Vertically disposed within the inner one of the vertical legs of the pipe 15 is a water supply pipe 16, provided with a plurality of spray nozzles 17, the purpose of these spray nozzles being to wash the ash dust from the steam and entrained air which is permitted to escape to the atmosphere through the U-shaped pipe 15.

At its lower end the U-shaped pipe 15 is provided with a discharge conduit 18 to permit the escape of wash water, condensed steam and entrained ash dust to a settling tank 19 conveniently disposed under ground and provided with an overflow pipe 20 to permit the escape of water to a sewer or the like.

While I have shown the inner leg of the U-shaped pipe 15 as extending up into the segmental chamber 12, and while this is the preferred arrangement, I do not care to so limit myself, as my invention may be used in connection with tanks provided with different baffle plate arrangements than that here shown.

In the operation of the ash conveyer system of which my improved tank forms a part, the steam and ashes are discharged through the pipe 9 and strike the baffle plate 14. The steam and entrained air and ash dust seek an avenue of escape through the segmental chamber 12, and the U-shaped vent pipe 15. The water sprays emitted by the nozzles 17, 17 serve effectually to wash the steam and entrained air as it passes downwardly within the inner leg of the pipe 15. The cleaned steam and air, after reaching the lower end of the pipe 15, passes up the outer leg of the pipe 15 and escapes to the atmosphere, whereas the wash water, entrained ash dust and water of condensation escape from the lower end of the pipe 15 through the conduit 18 to the settling tank 19.

It will be noted that inasmuch as the water spray is located inside the tank, there is practically no tendency for the spray water to freeze even in cold weather, as the body of ash around the inner leg of the vent pipe will at all times keep it free from ice.

Having thus described my invention, what I claim as new and desire to secure by Letters Patent of the United States is:

1. In combination with a closed ash tank of the class described, and a pressure ash conveyer conduit discharging therein, means for venting steam and entrained air from the tank consisting of a U-shaped pipe passing through the tank near the lower end thereof with its legs extending vertically one inside and one outside of the tank.

2. In combination with a closed ash tank of the class described, and a pressure ash conveyer conduit discharging therein, means for venting steam and entrained air from the tank consisting of a U-shaped pipe passing through the tank near the lower end thereof with its legs extending vertically one inside and one outside of the tank, together with a water supply pipe and spray nozzle for washing the steam and entrained air as the same pass through said U-shaped pipe.

3. In combination with a closed ash tank of the class described, and a pressure ash conveyer conduit discharging therein, means for venting steam and entrained air from the tank consisting of a U-shaped pipe passing through the tank near the lower end thereof with its legs extending vertically one inside and one outside of the tank, together with a water supply pipe and spray nozzle for washing the steam and entrained air as the same pass through said U-shaped pipe, and means connected with the lower end of said U-shaped pipe for draining therefrom the wash water, entrained ash dust and water of condensation.

4. In combination with a closed ash tank of the class described and a pressure ash conveyer conduit discharging therein, of an outlet tube extending vertically within the tank, said tube having its upper end communicating with the upper portion of the tank and its lower end extending through the tank and communicating with the atmosphere, and a spray nozzle within the tube arranged to spray water against the ash dust within the tube to prevent the passage of ash dust to the atmosphere.

5. In combination with a closed ash tank of the class described and a pressure ash conveyer conduit discharging therein, of an outlet tube extending vertically within the tank, said tube having its upper end communicating with the upper portion of the tank and its lower end extending through the tank and communicating with the atmosphere, a spray nozzle within the tube arranged to spray water against the ash dust therein to prevent the passage of the ash dust to the atmosphere, and a settling tank located below the outlet tube and communicating with the lower end of the tube, for receiving the water, emitted from the nozzle, and the ash dust.

In witness whereof, I hereunto subscribe my name this 13th day of July, A. D. 1917.

LORNE A. GRIFFIN.

Witnesses:
J. H. MUDGE, Jr.,
ROBERT F. BRACKE.